No. 841,618. PATENTED JAN. 15, 1907.
P. DE BRUYN.
APPARATUS FOR MEASURING GAS PRESSURES.
APPLICATION FILED NOV. 26, 1906.

Witnesses:
E. O. Hildebrand
M. Taylor.

Inventor
Paul de Bruyn
by Georgii & Massie
Attorneys

UNITED STATES PATENT OFFICE.

PAUL DE BRUYN, OF DÜSSELDORF, GERMANY.

APPARATUS FOR MEASURING GAS-PRESSURES.

No. 841,618.

Specification of Letters Patent.

Patented Jan. 15, 1907.

Application filed November 26, 1906. Serial No. 345,154.

*To all whom it may concern:*

Be it known that I, PAUL DE BRUYN, a subject of the German Emperor, residing at Düsseldorf, Germany, have invented new and useful Improvements in Apparatus for Measuring Gas-Pressures, of which the following is a specification.

Apparatus for measuring gas-pressures comprising a rod or rods forming part of the mechanism extending to the outside of the apparatus through a liquid seal of the bell type are liable to give erroneous indications, the amount of error varying with the fluctuating gas-pressure acting upon the inside of the seal-bell. This error, which is not so important in the case of ordinary simple or direct measurements, becomes of very great importance in the case of differential-pressure measurements and scientific observations.

This invention has now for object to obviate completely this liability to error by the provision of the improved liquid seal which is hereinafter described, and illustrated in the accompanying drawings, in which—

Figure 1:
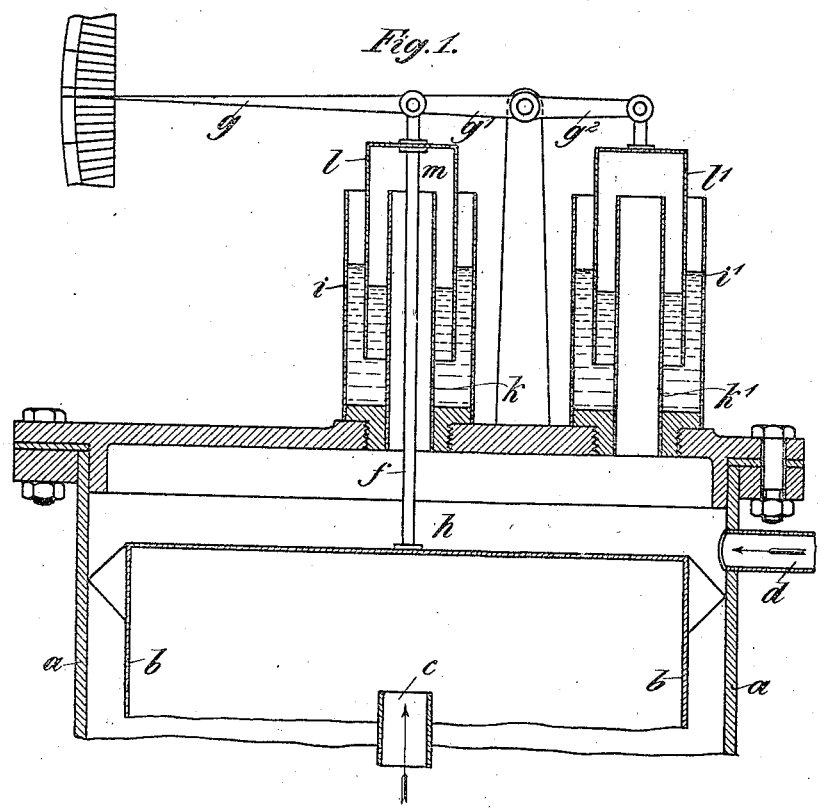
Figure 2:
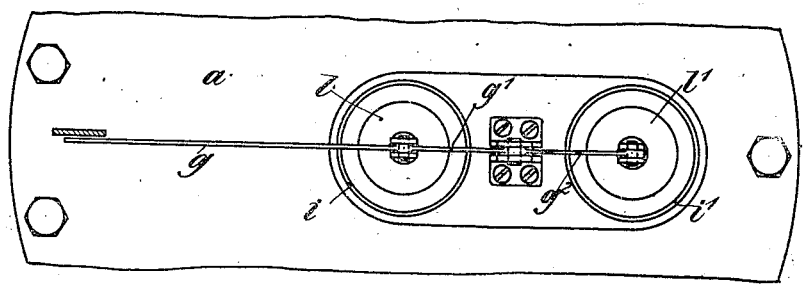

Figure 1 is a vertical central longitudinal section. Fig. 2 is a plan of a practical construction of the improved apparatus.

$a$ is a measuring vessel or pressure-chamber containing a bell or float $b$ of any suitable kind, which varies its position under the influence of the gases admitted through the inlets $c$ and $d$. The movement of the float is transmitted by means of the rod $f$ to the pointer $g$.

For the purpose of sealing the space $h$ from the atmosphere there is employed a liquid seal of the ordinary bell type consisting of two tubes $i$ and $k$, mounted one within the other on the cover of the chamber $a$. In the space between these two tubes is liquid into which dips a cylindrical bell $l$, open at its lower end, that is attached to and surrounds the rod $f$. It is obvious that in this arrangement the bell $l$ is caused by the varying gas-pressure in the space $m$ below it to exert an influence upon the movement of the rod $f$ which will affect the indications of pressure to an extent that will be the greater the greater the fluctuations of pressure which are transmitted through the inlet $d$ and the smaller the difference between the pressures at the inlets $c$ and $d$. Now in order to obviate this undesirable influence by means of a counteracting influence the bell $l$ is connected, according to this invention, to the bell $l'$ of another similar liquid seal having the same cross-sectional area and communicating with the same pressure-chamber in such a manner that the gas-pressures acting upon the two bells will counteract each other. A simple means of carrying out this idea is to provide a two-armed lever $g'$ $g^2$, fulcrumed on a support between the two bells, the arms $g'$ and $g^2$ being pivoted to the bells $l$ and $l'$, respectively.

The arm $g'$ may be extended, as shown, to constitute a part of the pointer $g$, which indicates the pressure or the difference between the pressures.

When certain circumstances preclude the bell $l'$ of the second liquid seal $i'$ $k'$ from having the same internal cross-sectional area as the bell $l$, then the lengths of the arms of the lever $g'$ $g^2$ must be to each other in the inverse proportions of the respective cross-sectional areas.

In cases where special circumstances do not allow of the arrangement of the second seal over the chamber with which the first seal is in communication or where a second chamber is available in which there is a pressure varying proportionally with the pressure in the first chamber the second seal may be applied to the said second chamber. It is to be understood that the cross-sectional areas of the bells and the lengths of the levers on which they act must be suited to the pressure or pressure differences.

This invention is also applicable with advantage in cases where only the gas-pressure under the bell $b$ is to be measured or where the space above the said bell is a closed space—that is to say, must not be in communication with the atmosphere. In such cases the movement of the bell causes a variation in the pressure in the space above it, which will give rise to errors of measurement. These errors will be obviated by the use of the second or counter seal $i'$ according to this invention.

I claim—

1. In apparatus for measuring gas-pressures in which a rod is employed to transmit the measuring movement from within a pressure-chamber to an external indicating device, the combination with said pressure-chamber, of a liquid seal of the bell type for sealing the said rod, an idle similar liquid seal communicating with said pressure-chamber, and a lever connecting the bells of the two liquid seals one with the other, whereby the upward tendency of the bell of the idle seal will exactly counteract the upward tendency of the bell of the rod-seal, and thereby the error in the measurement due to the bell of the said rod-seal is obviated, as set forth.

2. In apparatus for measuring gas-pressures in which a rod is employed to transmit the measuring movement from within a pressure-chamber to an external indicating device, the combination with said pressure-chamber, of a liquid seal of the bell type for sealing the said rod, a separate pressure-chamber in which the pressure corresponds to the pressure in the first-mentioned pressure-chamber, an idle liquid seal of the bell type communicating with said separate pressure-chamber, and a lever connecting the bells of the two liquid seals one with the other, whereby the upward tendency of the bell of the idle seal will exactly counteract the upward tendency of the bell of the rod-seal, and thereby the error in the measurement due to the bell of the said rod-seal is obviated, as set forth.

In testimony whereof I have signed my name to this specification in the presence of two subscribing witnesses.

PAUL DE BRUYN.

Witnesses:
ALFRED POHLMEYER.
M. ENGELS.